United States Patent
Branzell et al.

(10) Patent No.: US 7,275,429 B2
(45) Date of Patent: Oct. 2, 2007

(54) MECHANICAL SELF-CLEANING PROBE VIA BI-METALLIC OR SHAPE MEMORY

(75) Inventors: John E. Branzell, Skokie, IL (US); Christopher J. Thomson, Palatine, IL (US)

(73) Assignee: ITT Manufacturing Enterprises Inc., Wilmington, DE (US)

( * ) Notice: Subject to any disclaimer, the term of this patent is extended or adjusted under 35 U.S.C. 154(b) by 99 days.

(21) Appl. No.: 11/101,179

(22) Filed: Apr. 6, 2005

(65) Prior Publication Data
US 2006/0225500 A1    Oct. 12, 2006

(51) Int. Cl.
*G01F 23/26*    (2006.01)

(52) U.S. Cl. .................... 73/304 R; 73/295; 73/290 R; 15/97.1

(58) Field of Classification Search ............. 73/304 R, 73/295, 290 R; 15/97.1
See application file for complete search history.

(56) References Cited

U.S. PATENT DOCUMENTS

| | | | |
|---|---|---|---|
| 1,891,705 A | 5/1932 | Delas | |
| 2,003,018 A | 5/1935 | Spencer | |
| 2,121,259 A | 6/1938 | Parsons | |
| 3,061,721 A | 10/1962 | Brenner | |
| 3,527,611 A | 9/1970 | Newfarmer | |
| 3,820,184 A | 6/1974 | Stone | |
| 4,142,418 A | 3/1979 | Lagher | |
| 4,357,694 A | 11/1982 | Montouri | |
| 4,710,233 A * | 12/1987 | Hohmann et al. | 205/701 |
| 6,065,867 A * | 5/2000 | Sulmont et al. | 374/139 |
| 6,432,213 B2 | 8/2002 | Wang et al. | |

* cited by examiner

Primary Examiner—Hezron Williams
Assistant Examiner—Rodney Frank

(57) ABSTRACT

A conductance probe is provided for adapting in a device having a container for holding a fluid therein. The a conductance probe is installed therein for providing a conductance signal indicating whether it is in contact with the fluid. The conductance probe features a conductance probe cleaner having a temperature sensitive element arranged on a tip thereof that is responsive to a change in the temperature of the fluid, for wiping the conductance probe to keep deposits from building up thereon. The scope of the invention includes any and all bi-metal configurations using temperature changes to create probe cleaning. The device may be a boiler or other suitable device having a heating element for boiling water contained therein. The temperature sensitive element is arranged on a metal tip of the conductance probe so as to move axially when wiping the same.

32 Claims, 7 Drawing Sheets

Figure 1
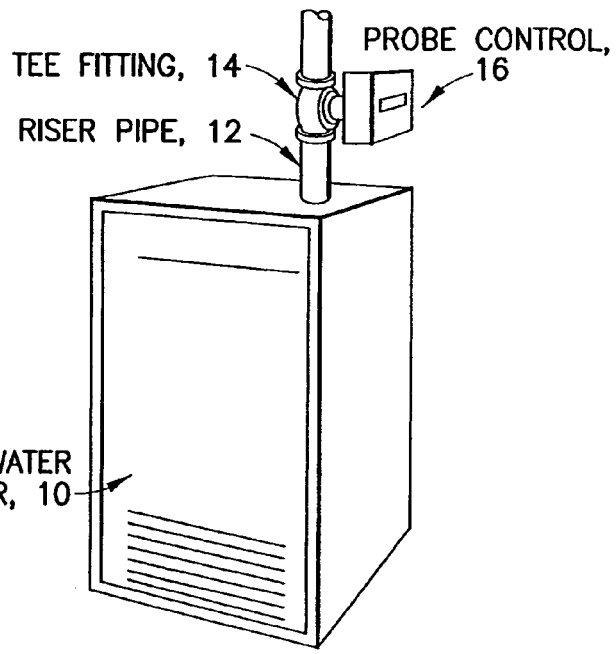
FIG.1(a)
HOT WATER BOILER
(PRIOR ART)
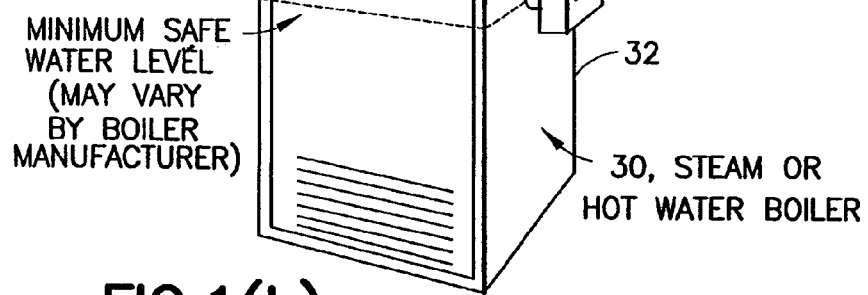
FIG.1(b)
STEAM OR HOT WATER BOILER
(PRIOR ART)
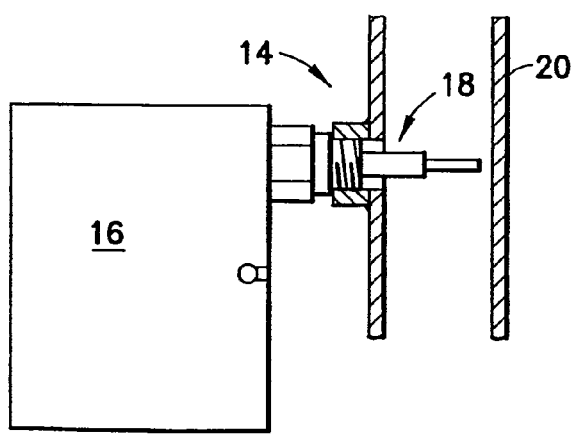
FIG.1(c)
PROBE CONTROL COUPLED
TO TEE FITTING IN FIGURE 1(a)
(PRIOR ART)

FIG.2(a) CONDUCTANCE PROBE (PRIOR ART)

FIG.2(b) BASE OF CONDUCTANCE PROBE (PRIOR ART)

FIG.2(c) CROSS-SECTION OF CONDUCTANCE PROBE IN FIGURE 2(a) (PRIOR ART)

MECHANICAL SELF-CLEANING PROBE VIA BI-METALLIC OR SHAPE MEMORY

BACKGROUND OF THE INVENTION

1. Field of Invention

The present invention relates to an apparatus for cleaning a conductance probe; and more particularly to an apparatus for continuously cleaning a conductance probe in a steam or hot water boiler during operation in order to control the water level therein.

2. Description of Related Art

Conductance style probes are installed in boilers in order to control the water level in the boiler and to prevent the burner from firing if the water level is too low. When water is below the conductance probe, the probe has low conductance and the probe control unit signals the water feeder or pump to turn on and feed water into the boiler. In addition, the burner is prevented from firing because the water level is too low. If the probe is in water, the conductance is high and the probe control unit signals the water feeder or pump to turn off. In addition, the burner is now allowed to fire, if required. In use, as time passes, a layer of deposits can build up on the tip of the conductance probe. The layer of deposits may eventually affect the conductance characteristics of the probe, and result in false probe readings. The false readings may result in either flooding of the boiler or a dry firing of the boiler. To avoid these problems, it is currently recommended that the probes be cleaned on a routine basis. However, such cleaning is costly because it requires shutdown of the boiler and the downside risk for failure to do so can result in the boiler not operating properly, including possibly overheating or even exploding.

By way of example, FIG. 1(a) shows a hot water boiler generally indicated as 10 that is known in the art including a riser pipe 12 having a tee fitting 14 arranged thereon with a probe control 16 arranged thereon. The probe control 16 has the conductance probe generally indicated as 18 arranged therein and inside the walls 20 of the tee fitting 14, as shown in FIG. 1(c). In operation, the probe control 16 provides an electrical signal to the fluid and senses the conductance signal from the conductance probe 18. In this embodiment, the conductance probe 18 monitors the water flowing through the riser pipe 12.

In comparison, FIG. 1(b) shows a steam or hot water boiler 30 having a container 32 with a probe control 34 arranged on a side wall 32a thereof. The probe control 34 has the conductance probe (not shown) arranged therein and inside the side wall 32a, similar to conductance probe 18 in FIG. 1(c). In this embodiment, the conductance probe (not shown) monitors the water level in the container 32 to make sure a minimum safe water level is maintained therein.

FIGS. 2(a), 2(b) and 2(c) show the conductance probe 18 in FIG. 1(c) in greater detail, which includes a base 50, an assembly rod 52, a ceramic insulator 54, a spring washer 56, screws 56a, 56b and nuts 58. The assembly rod 52 is a conducting element partially wrapped with Teflon 53 for providing an electric insulator between the base 50 and the rod assembly 52, leaving a conducting tip 55 as shown. The operation of the conductance probe 18 in relation to the device 10 or 30 (FIGS. 1(a) and (b) and the probe control 16 is known in the art. By way of example, when installed in a boiler or other suitable device, a wire 57a from a printed circuit board 57 in the probe control 16 (FIG. 1(a) or (b)) is coupled between the nuts 58 and the base 50, and a pair of wires such as 57b are coupled from the screws 56a, 56b to ground. When the probe comes into contact with the fluid, a conductance signal is provided to the PCB 57 via the wire 47a. The conductance probe may also take the form of a capacitive-based probe which is known in the art having a layer of Teflon or other suitable insulator or dielectric material covering the whole tip.

A search was conducted for prior art documents having conductance probe cleaners and many different patents were developed, although none of which taught or suggested the present invention. For example, U.S. Pat. Nos. 2,003,018; 2,121,259; 4,142,418 and 4,357,694 disclose devices having bi-metallic structure. In particular, the '018 patent discloses a structure including a pre-formed cupped inner disc 1 of shape and curvature made of sheet metal and a peripheral outer band made of a material having a different thermal coefficient of expansion than the disc 1. The structure is used in a thermostat. In operation, the structure inverts and re-inverts in response to a temperature change. In comparison, the '259 patent discloses a bi-metallic spring member 32 wrapped about pipe 14 that expands or contract in response to a temperature change. Neither of these two patents suggests using the same for cleaning a conductance probe tip. Moreover, the '418 patent discloses a temperature sensitive member; while the '694 patent discloses thermally responsive bimetallic jewelry.

Other patents developed in related searches include U.S. Pat. Nos. 1,891,705; 3,061,721; 3,527,611 and 6,432,213, which show elements disposed on pipe exteriors for cleaning the same. In particular, the '705 patent discloses a heat exchanger having scale removers 15 loosely arranged on pipes 14 for rubbing sediment that may form thereon when the pipes 14 are rotated. In comparison, the '721 discloses a water purifier including a casing 10 having tubes 25 arranged therein, the tubes having a water impeller rotator 32 with blades 35 and cleaning or brushing tools 36 arranged thereon for cleaning the tubes as water flows through the casing 10. The '611 discloses a pipe segment 10 having abrasive collars arranged thereon for scouring the surface of the pipe in response to a cyclic motion of the pipe 10 caused by a vibration generator or sonic oscillator 12. The '213 patent discloses a tube scrapper such as 12 for scraping the exterior of a tube or pipe. Further, there is also a large body of art related to external pipe cleaning means that are associated with hand tools for cleaning the same. For example, the '184 patent discloses a pipe cleaning device. Some other patents known in the art having electrodes and/or probes and devices for cleaning the same to detect parameters include U.S. Pat. Nos. 1,473,060 and 4,668,369, which show electrode cleaners having devices for moving a cleaning device to clean an electrode. For example, in the '060 patent, the electrode cleaning device is a rotating brush powered by a motor. In the '369 patent, the electrode cleaning device is a reciprocating wiper structure powered by an air operated cylinder. Other known patents show various means for cleaning shafts, not electrodes, including U.S. Pat. No. 3,216,485 having a loosely fitting collar member arranged on a rod, which forms part of a heat exchanger, to keep deposits from forming on the rod. None of these other patents developed in related searches teach or suggest the present invention.

In view of the aforementioned, there is a real need in the art for a mechanical self-cleaning conductance probe, especially for use in steam or hot water boilers and other devices for heating fluids, as well as a device having such a mechanical self-cleaning conductance probe.

SUMMARY OF INVENTION

In its broadest sense, the present invention provides a new and unique conductance probe for adapting in a device having a container for holding a fluid therein, the conductance probe being installed therein for providing a conductance signal indicating whether it is in contact with the fluid. The conductance probe features a conductance probe cleaner having a temperature sensitive element arranged on a tip of the conductance probe that is responsive to a change in the temperature of the fluid, for wiping the tip of the conductance probe to keep deposits from building up thereon.

In one embodiment, the temperature sensitive element may include one or more bi-metal discs, which are slightly curved at room temperature. In operation, as the temperature in the device starts to increase, the one or more bi-metal discs start to flatten out and invert at a certain change in the temperature. The one or more bi-metal discs have an inside surface with an inside diameter, the inside surface sliding along the tip as the disc inverts so as to clean deposits that have built up on the surface of the tip. The one or more bi-metal discs may also invert with a snapping action to dislodge the deposits that have built up on the tip. The scope of the invention is intended to cover any and all bi-metal configurations using temperature changes to create probe cleaning.

In an alternative embodiment, the temperature sensitive element may include one or more shape memory alloys having predetermined temperature related properties, which are relatively weak and pliable below a certain transition temperature, and revert to a predetermined shape and become relatively strong and non-pliable above the certain transition temperature. The one or more shape memory alloys may be shaped as a coil spring. The conductance probe cleaner may include a first coil spring made of a shape memory alloy in combination with a second coil spring made from a different material, such as stainless steel, both stacked up end-to-end on the tip. The second coil spring would be lightly loaded on the tip. In operation, at room temperature the shape memory alloy coil spring is weak and is compressed close to its solid height (i.e. no space between the coils) by the stainless steel coil spring, when above its transition temperature (e.g. boiler operating temperature), the shape memory alloy spring becomes stronger, overpowers the stainless steel coil spring and elongates to its predetermined shape. When the device cools (e.g. during a boiler shutdown), the shape memory alloy coil spring reverts back to its weak condition and is again compressed close to its solid height (i.e. no space between the coils) by the stainless steel coil spring. The shape memory alloy coil spring and/or the stainless steel coil spring would have an inner surface with an inside diameter that is slightly larger than the outside diameter of the tip so that either or both springs wipe the surface of the metal tip when the shape memory alloy coil spring changes shape. The scope of the invention is intended to cover any and all configurations that use the temperature induced, shape change properties of shape memory alloys for the purpose of probe cleaning.

The present invention also includes a device having such a conductance probe adapted therein. The device may be a boiler or other suitable device having a heating element for boiling water contained therein, having the conductance probe cleaner arranged on a metal tip of the conductance probe so as to move axially when wiping the same. During normal operation, the temperature inside of low-pressure boilers is somewhere between 212 F and 250 F. When a boiler is periodically shut down, the temperature inside the boiler can drop back to ambient room temperature, if the length of the shut down time is long enough. When the boiler is restarted, the temperature will again rise to its normal operating range. The large swings in temperature associated with shut down and start up can be put to use to clean the metal tip of the conductance probe. Both bi-metals and shape memory alloys have properties that allow them to change shape, or to move, with changes in temperature. With the proper design, of which there are many, the movement of the bi-metal or shape memory alloy, with changes in temperature, can be used to create a wiping action (a cleaning action) on the metal tip of the probe. This wiping action will keep the layer of deposits from building up on the metal tip of the probe.

In effect, the whole thrust of the invention is to use temperature sensitive materials that that response differently to temperature change. In the one case, the temperature sensitive materials take the form of a bi-metal material that changes shape in response to temperature change, while in the second case, the temperature sensitive materials take the form of two different parts have different parts made of two different materials that change shape differently in response to temperature change.

One advantage of the present is that by adding the bi-metal part or shape memory alloy part on the metal tip of the conductance probe it may be possible to either eliminate or greatly reduce the need for routine and expensive cleaning of the surface of the tip of the conductance probe.

BRIEF DESCRIPTION OF THE DRAWING

The drawing, not drawn to scale, includes the following Figures:

FIG. 1 includes FIGS. 1(a)-(c), in which FIG. 1(a) shows a diagram of a known hot water boiler; FIG. 1(b) shows a diagram of a known steam or hot water boiler; and FIG. 1(c) shows a diagram of a known probe control coupled to a tee fitting shown in FIG. 1(a).

FIG. 2 includes FIGS. 2(a)-(c), in which FIG. 2(a) shows a partial assembly drawing of a known conductance probe shown in FIG. 1(c); FIG. 2(b) shows a partial assembly drawing of a side view along lines b-b of the conductance probe shown in FIG. 2(a); and FIG. 2(c) shows a partial assembly drawing of a cross-section along lines c-c of the conductance probe shown in FIG. 2(a).

FIG. 5(a) shows a plan view of a bi-metal disc according to the present invention; and FIG. 5(b) shows a cross-sectional view of the bi-metal disc in FIG. 5(a) along lines A-A.

FIG. 6(a) shows a diagram of an embodiment of a conductance probe cleaner having a group of bi-metal discs at room temperature according to the present invention; and FIG. 6(b) shows the conductance probe cleaner in FIG. 5(a) at a boiler operating temperature.

FIG. 7(a) shows a diagram of an embodiment of a conductance probe cleaner having a bi-metallic element arranged on a conductance probe tip according to the present invention; FIG. 7(b) shows a side view of the conductance probe cleaner in FIG. 7(a) along lines B-B; and FIG. 7(c) shows an end view of the conductance probe cleaner in FIG. 7(a) along lines C-C.

FIG. 8(a) shows a diagram of an embodiment of a conductance probe cleaner having a bi-metallic element arranged on a conductance probe tip according to the present invention; FIG. 8(b) shows a side view of the conductance probe cleaner in FIG. 8(a) along lines B-B; and FIG. 8(c) shows an end view of the conductance probe cleaner in FIG. 8(a) along lines C-C.

FIG. 9(a) shows a diagram of an embodiment of a conductance probe cleaner having a bi-metallic element arranged on a conductance probe tip according to the present invention; and FIG. 9(b) shows a side view of the conductance probe cleaner in FIG. 9(a) along lines B-B.

DETAILED DESCRIPTION OF INVENTION

Figure 3:
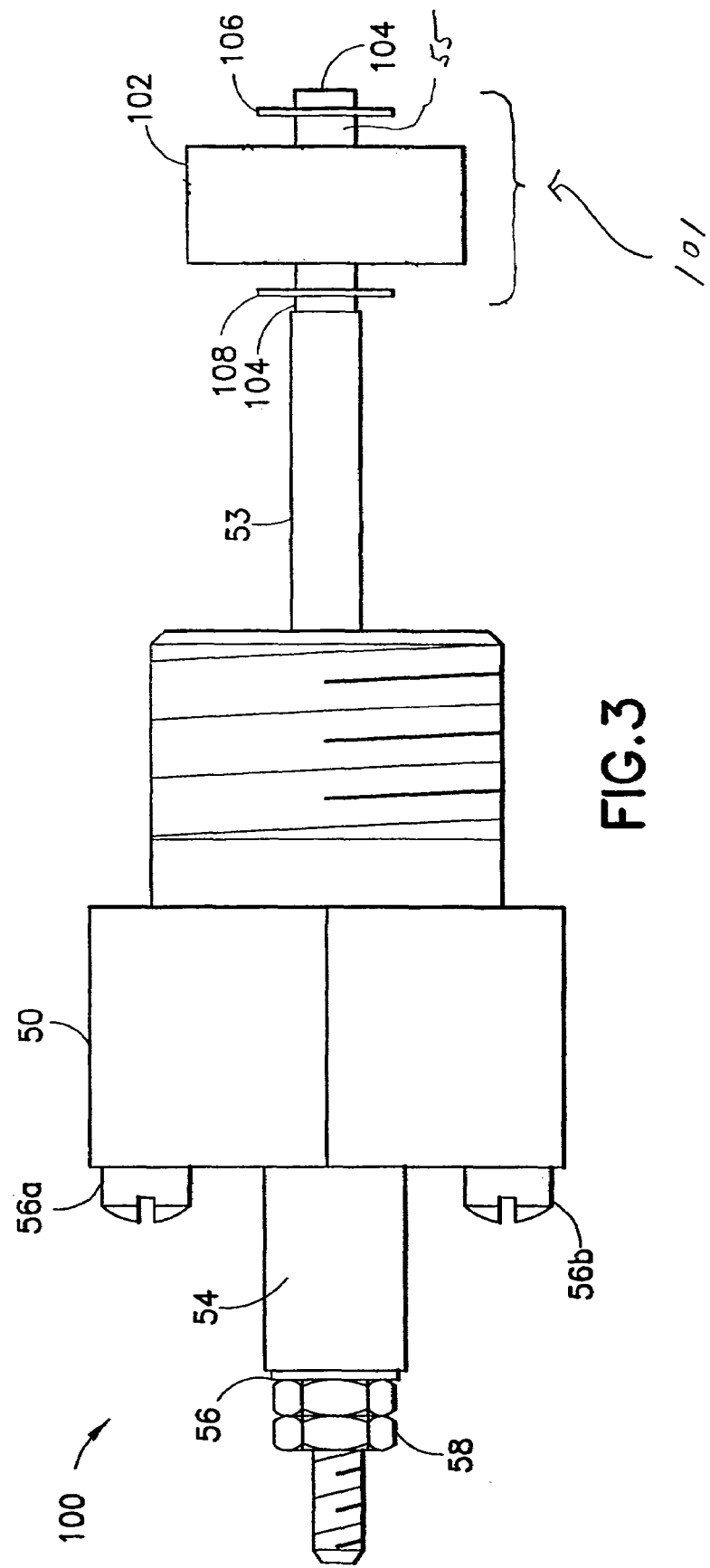
FIG. 3 shows a photograph of a conductance probe having a conductance probe cleaner thereon according to the present invention.

FIG. 3 shows, by way of example, a conductance probe generally indicated as 100 featuring a conductance probe cleaner arrangement 101 having temperature sensitive element 102 arranged on a metal tip 104 of the conductance probe 100 that is responsive to a change in the temperature of a fluid (not shown), for wiping the metal tip 104 of the conductance probe 100 to keep deposits from building up thereon, so as to form a mechanical self-cleaning conductance probe according to the present invention. The scope of the invention is intended to cover any and all bi-metal configurations using temperature changes to create probe cleaning. Consistent with that discussed above in relation to FIG. 1, the device may be a steam or hot water boiler, or other suitable device, having a heating element for boiling water contained therein. In operation, the temperature sensitive element 102 responds to the change in temperature of the fluid in a container, such as container element 32 shown in FIG. 1(b), for wiping a surface of the tip 104 of the conductance probe 100 to keep deposits from building up on the same. As shown, the temperature sensitive element 102 is arranged and retained on the tip 104 by one or more retaining clips 106, 108 arranged thereon.

Figure 2:
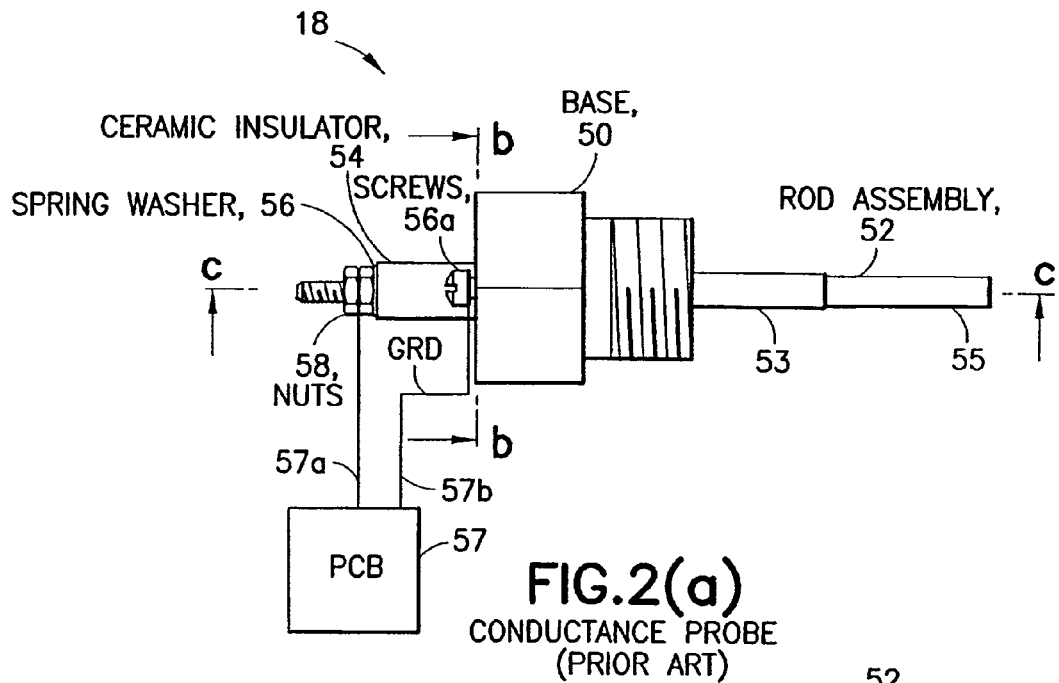
Figure 2:
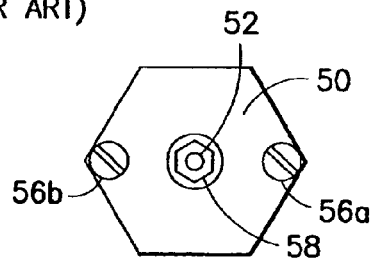
Figure 2:
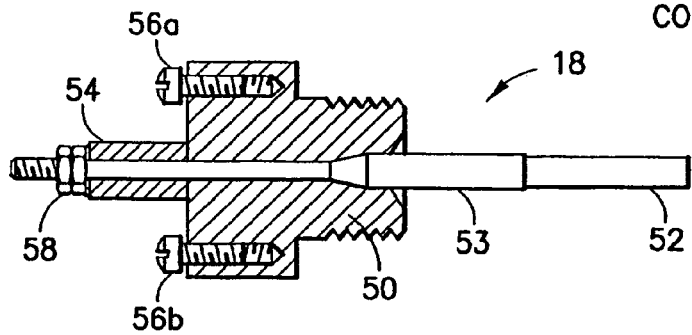
Figure 4:
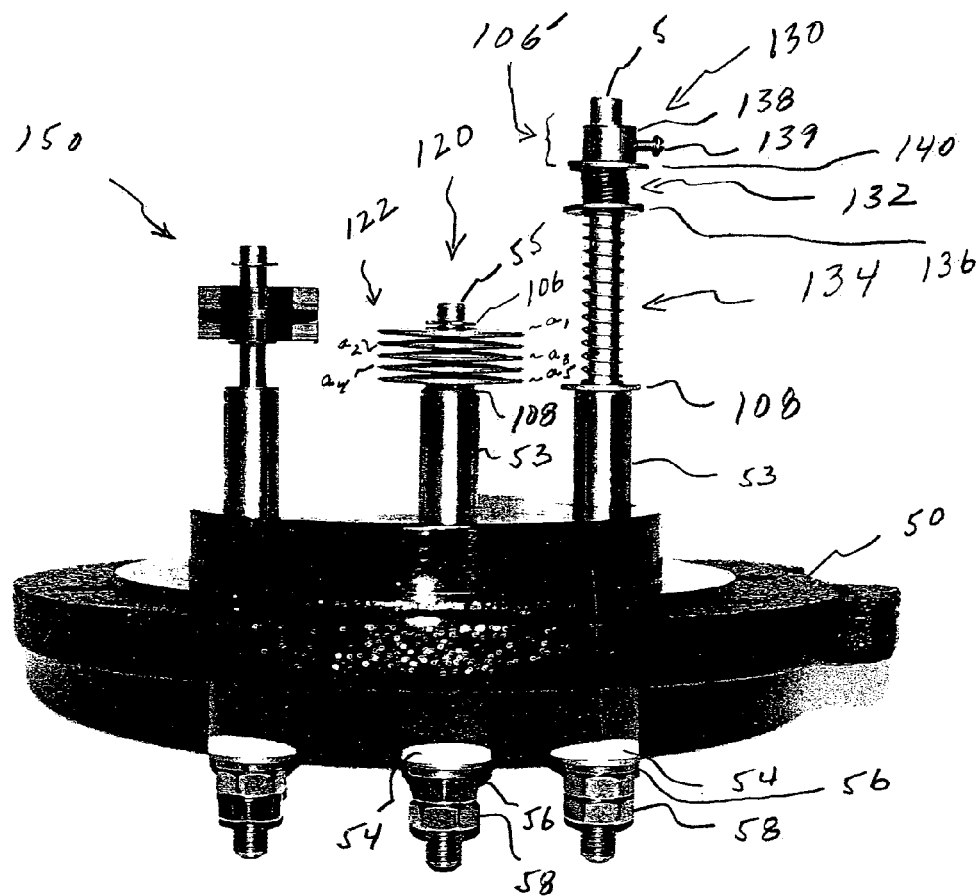
FIG. 4 shows prototypes of the conductance probe cleaner according to the present invention.

FIG. 4 shows an embodiment of a conductance probe cleaner arrangement according to the present invention generally indicated as 120 having one or more bi-metal discs generally indicated as 122 (see also FIGS. 5-6) used as conductance probe cleaners. The bi-metal discs 122 include bi-metal disc pairs labeled $a_1, a_2, \ldots, a_5$ (see FIG. 6). Other parts shown in FIG. 4 including parts 50, 52-56, 58, 106, 106', 108 of the conductance probe cleaner arrangements 120, 130 are labeled consistent with that described above. In operation, in response to a temperature change that causes an inversion or snapping of the one or more bi-metal discs 122, the inside surface of the one or more bi-metal discs 122 moves axially along the rod assembly 52 (see FIG. 2) for removing and/or keeping deposits from building up on the conductance probe tip 55. The embodiment is described in greater detail in relation to FIGS. 5-9 below.

FIG. 4 also shows another embodiment of a conductance probe cleaner arrangement according to the present invention generally indicated as 130 having one or more shape memory alloys generally indicated as 132 in combination with one or more coil springs generally indicated as 134 and one or more scraping elements 136. The conductance probe cleaner arrangement 130 also includes a retaining mechanism generally indicated as 106' having a clamp 138, a retaining screw 139 and an optional washer 140. In response to a temperature change that causes an expansion and contraction of the memory shape alloy 132, the one or more scraping elements 136 move axially along the rod assembly 52 for removing and/or keeping deposits from building up on the conductance probe tip 55. In the arrangement 130, the spring 132 is made from a shape memory alloy, and the coil spring 134 is made from stainless steel or other suitable metal. The springs 132, 134 are stacked up end to end over the metal tip 55 of the probe. The ends of the stack up are constrained such that the stainless steel spring 134 is lightly loaded. At room temperature, the shape memory alloy spring 132 is weak and is compressed close to its solid height (no spacing between coils) by the stainless steel spring 134. Above its transition temperature (at boiler operating temperatures) the shape memory alloy spring 132 becomes stronger, it over-powers the lightly loaded stainless steel spring 134, and it elongates to its predetermined shape. When the conductance probe cools off (e.g. during a boiler shut down), the shape memory alloy spring 132 will revert back to its weak condition and is again compressed close to its solid height by the stainless steel spring 134. Since the inside diameters of both springs are only slightly larger than the outside diameter of the probe tip 55, the compression/elongation of both springs caused the individual coils of the springs 132, 134 to wipe along the metal tip 55 of the probe. The wiping action will clean the probe tip of built up deposits. The embodiment is described in greater detail in relation to FIG. 10 below.

FIG. 4 also includes an embodiment of a conductance probe cleaner arrangement generally indicated as 150 that is disclosed in patent application Ser. No. 11/004,660, filed Dec. 2, 2004, entitled "Mechanical Self Cleaning Probe via Jiggler", which is hereby incorporated by reference in its entirety.

FIGS. 5-9: Bi-Metallic Disc(s) Embodiments

Figure 5:
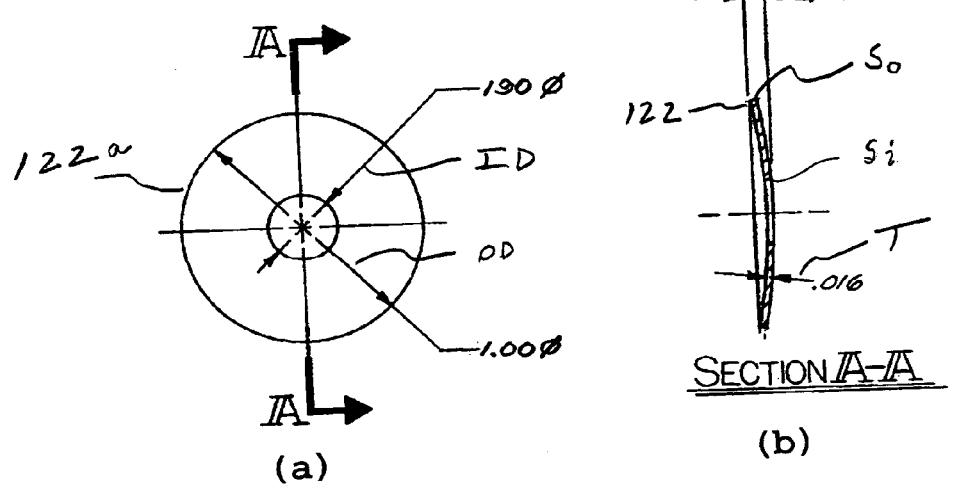
FIG. 5 includes FIGS. 5(a) and (b)

FIG. 5 shows, by way of example, an example of one bi-metal disc 122a having an outer diameter (OD) of about 1.00 unit (ø), an inner diameter of 0.19 units in FIG. 5(a) and a thickness (T) of about 0.016 units (see FIG. 5(b). In operation, the bi-metal disc 122a will snap over when the temperature is in a range of 205<T<220 degrees Fahrenheit, and will reset when the temperature is in a range of 180<T<195 degrees Fahrenheit. FIG. 5(b) shows when snapping over the outer circumferential surface So and the inner circumferential surface Si of the bi-metal disc 122a will move a distance x axially about 0.04 units.

Figure 6:
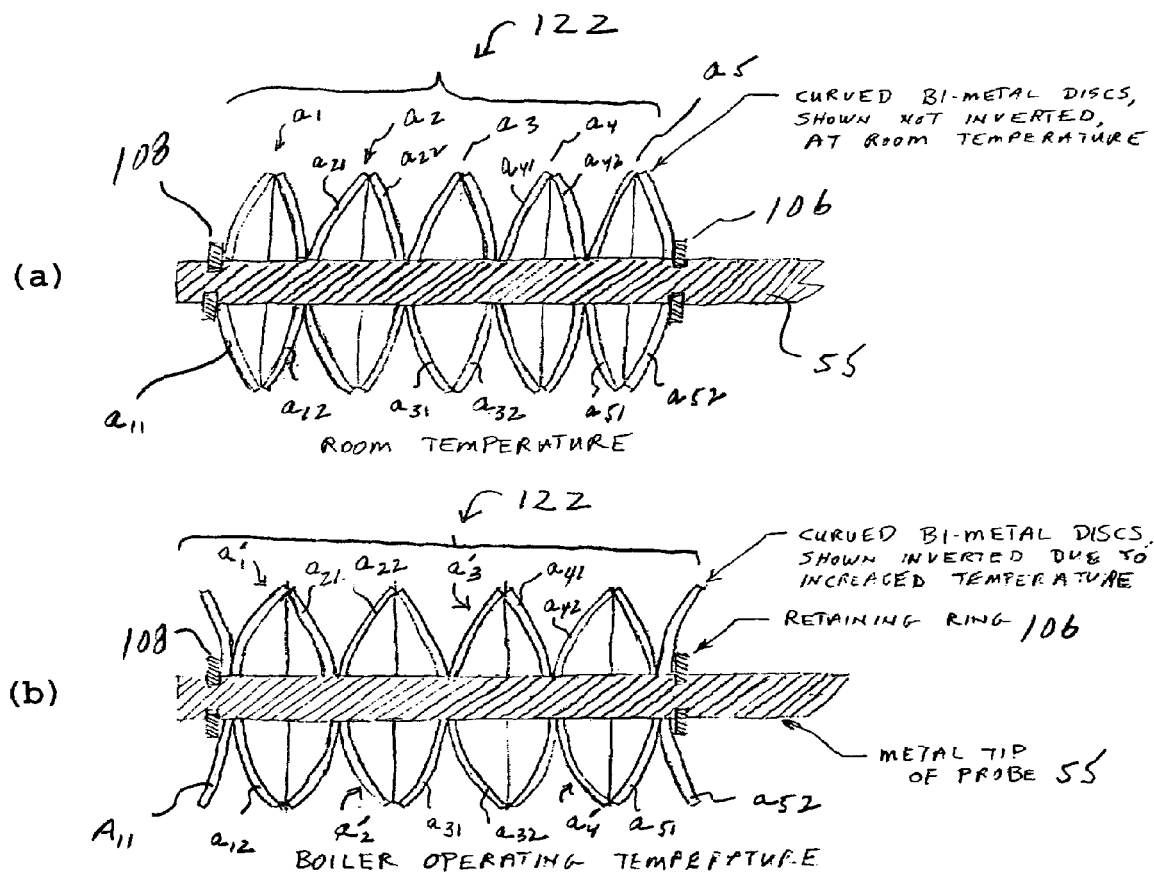
FIG. 6 includes FIGS. 6(a) and (b)

FIG. 6 shows, by way of example, one arrangement of a plurality of the one or more bi-metal discs 122, including five (5) bi-metal disc pairs $a_1, a_2, \ldots, a_5$, which are shown slightly curved and not inverted at room temperature. The bi-metal disc pairs include disc pairs $a_{11}, a_{12}; a_{21}, a_{22}; \ldots a_{51}, a_{52}$. In operation, as the temperature in the device starts to increase, the one or more bi-metal discs start to flatten out and invert (with a snapping action) at a certain change in the temperature, such as boiler temperature, so as to form four inverted bi-metal disc pairs $a_1', a_2', a_3', a_4'$, which are shown slightly curved and inverted at boiler operating temperature. The inverted bi-metal disc pairs include disc pairs $a_{12}, a_{21}; a_{22}, a_{31}; a_{32}, a_{41}; a_{42}, a_{51}$. As shown, the bi-metal discs $a_{11}$ and $a_{52}$ do not form part of a disc pair. Note that the inside or inner circumferential surface Si (see FIG. 5(b)) of the bi-metal discs have to slide along the metal tip 55 of the conductance probe as the temperature changes and the discs invert. The sliding action wipes away deposits that have built up on the metal tip. The snapping action dislodges the deposits that have built up on the tip. When deployed in a boiler device, such as that shown in FIG. 1, as the temperature in the boiler increases, the discs start to flatten out. As the boiler temperature approaches 212 F. the discs will invert (the side that was concave at low temperature becomes convex at high temperature).

Figure 7:
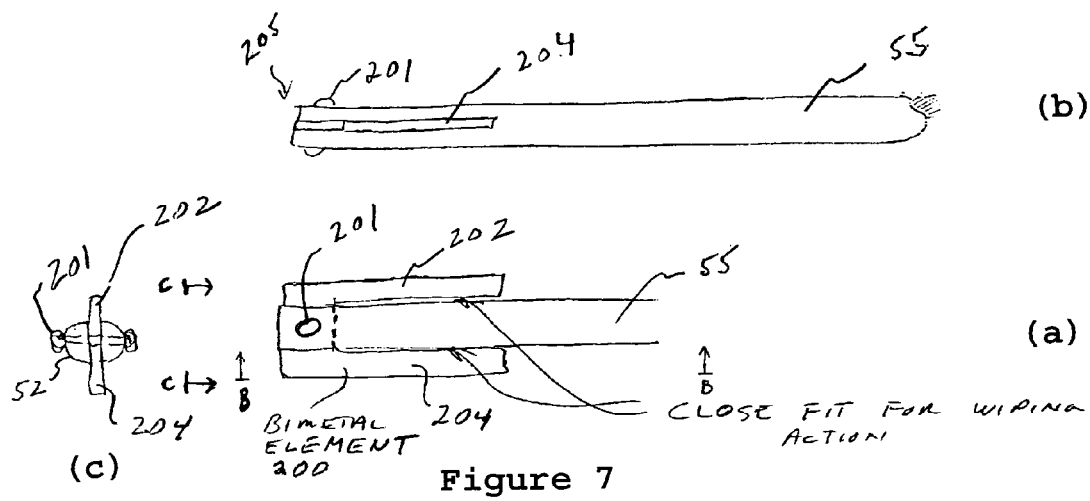
FIG. 7 includes FIGS. 7(a), (b) and (c)
Figure 8:
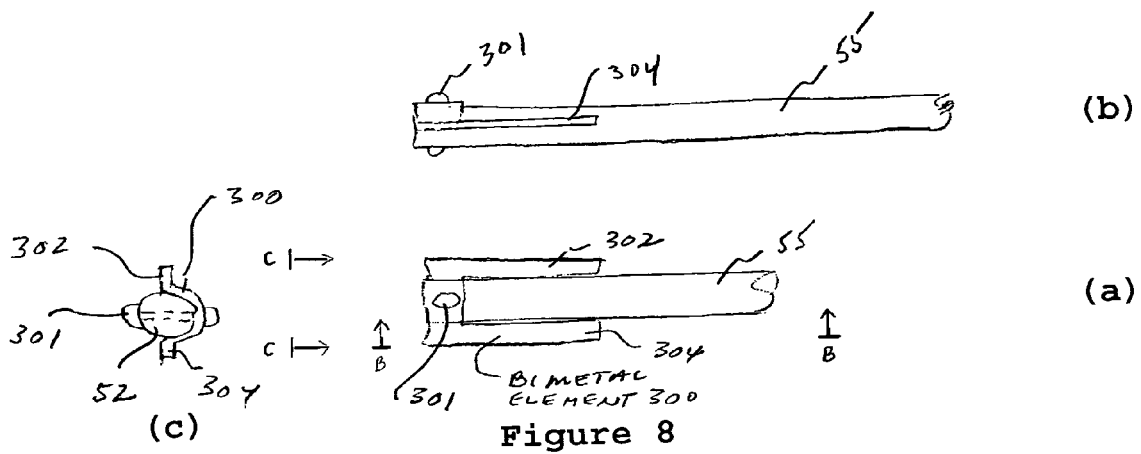
FIG. 8 includes FIGS. 8(a), (b) and (c)
Figure 9:
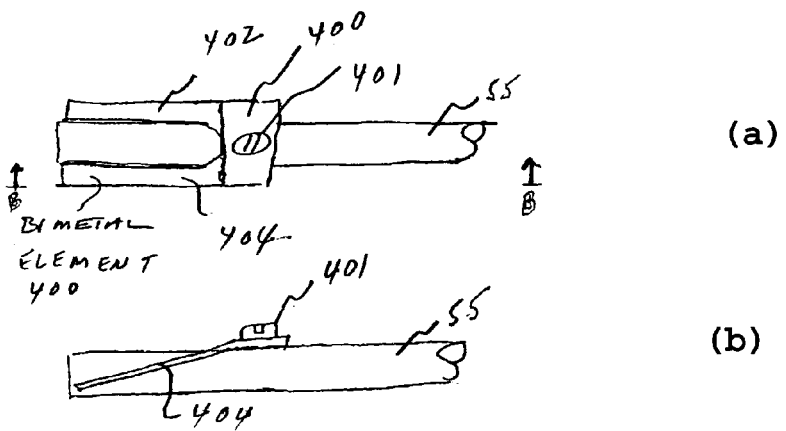
FIG. 9 includes FIGS. 9(a) and (b)

It is important to note that the scope of the invention is not intended to be limited to any particular type, or kind, or configuration, or shape of bi-metal disc(s), or any particular type, or kind, or combination of materials used to make the bi-metal disc(s), or any particular dimensions of the bi-metal disc(s), or the any particular number of bi-metal disc(s) used in the temperature sensitive element that forms part of the conductance probe cleaner arrangement according to the present invention. For example, FIGS. 7-9 show other configurations that are possible in which a bi-metal part changes shape with changes in temperature and the movement of the bi-metal part is used to wipe off deposits that may have built up on the metal tip of a probe. The present invention in intended to cover any and all bi-metal configurations using temperature changes to create probe cleaning and is not just limited to the use of bi-metal discs.

In particular, FIG. 7 shows a temperature sensitive bi-metal element 200 arranged in a slit (unlabelled) and affixed by a member 201 to an end 205 of a conductance probe tip 55. The temperature sensitive bi-metal element 200 have one or more bi-metal members 202, 204 that are arranged to have a close fit for wiping action in relation to the tip 55. The member 201 passes through an aperture (unlabelled) in the end 205. In operation, the one or more bi-metal members 202, 204 respond to a change in the temperature of a fluid in a device (see FIGS. 1-2), for wiping the tip of the conductance probe 52 to keep deposits from building up thereon.

FIG. 8 shows an alternative embodiment to that shown in FIG. 7 wherein the temperature sensitive bi-metal element 300 is arranged on the surface and affixed by a member 301 to an end 305 of a conductance probe tip 55. The temperature sensitive bi-metal element 300 have one or more bi-metal members 302, 304 that are arranged to have a close fit for wiping action in relation to the tip 55. The member 301 passes through an aperture (unlabelled) in the end 305. In operation, the one or more bi-metal members 302, 304 respond to a change in the temperature of a fluid in a device (see FIGS. 1-2), for wiping the tip of the conductance probe 52 to keep deposits from building up thereon.

FIG. 9 shows still another alternative embodiment to that shown in FIGS. 7 and 8 wherein the temperature sensitive bi-metal element 400 is arranged on the surface and affixed by a member 401 at an intermediate part 306 of a conductance probe tip 55. The temperature sensitive bi-metal element 400 have one or more bi-metal members 402, 404 that are arranged to have a close fit for wiping action in relation to the tip 55. The member 401 passes through an aperture (unlabelled) in the intermediate part 405. In operation, the one or more bi-metal members 402, 404 respond to a change in the temperature of a fluid in a device (see FIGS. 1-2), for wiping the tip of the conductance probe 52 to keep deposits from building up thereon.

Figure 10:
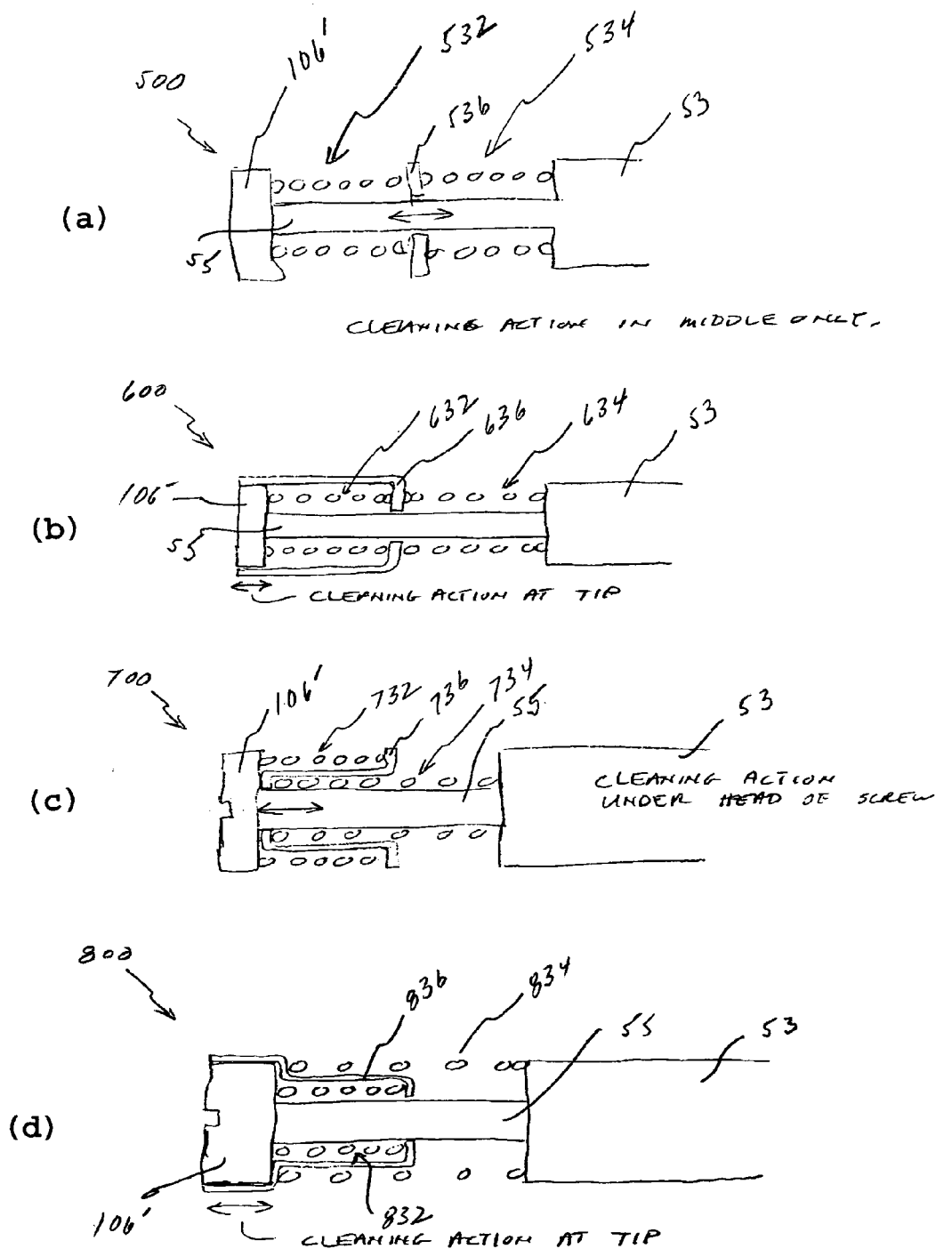
FIG. 10 includes FIGS. 10(a)-(d), which show diagrams of embodiments of different conductance probe cleaners having respective shape memory alloy elements arranged on respective conductance probe tips according to the present invention.

FIG. 10: Other Shape Memory Alloys Embodiments

FIG. 10 shows other embodiments of the conductance probe cleaning arrangement using shape memory alloy. As discussed above, the shape memory alloys have unique, temperature related properties. Below their transition temperature they are relatively weak and are quite pliable. Above their transition temperature they revert to a predetermined shape and they become relatively strong and non-pliable. These properties can be used to create a probe cleaning device that operates on the same temperature change principles as the bi-metal devices described above. It is important to note that FIG. 10(a) shows yet another alternative embodiment of the conductance probe cleaner arrangement generally indicated as 500 that includes a first coil spring 532 made of a shape memory alloy in combination with a second coil spring 534 made from a different material, such as stainless steel, both stacked up end-to-end on the tip 55 of the conductance probe. The second coil spring 534 would be lightly loaded on the tip 55. In operation, at room temperature the shape memory alloy coil spring 532 is weak and is compressed close to its solid height (i.e. no space between the coils) by the stainless steel coil spring 534, when above its transition temperature (e.g. boiler operating temperature), the shape memory alloy spring 532 becomes stronger, overpowers the stainless steel coil spring 534 and elongates to its predetermined shape. When the device cools (e.g. during a boiler shutdown), the shape memory alloy coil spring 532 reverts back to its weak condition and is again compressed close to its solid height (i.e. no space between the coils) by the stainless steel coil spring 534. The shape memory alloy coil spring 532 and/or the stainless steel coil spring 534 have an inner surface with an inside diameter that is slightly larger than the outside diameter of the tip 55 so that either or both springs 532, 534 wipe the surface of the metal tip 55 when the shape memory alloy coil spring 532 changes shape. In addition, the conductance probe cleaning arrangement may include a scraper 536 having an inner surface for wiping the tip of the conductance probe to keep deposits from building up thereon. As a person skilled in the art would appreciate, the scope of the invention is also intended to include the spring 634 being made from a shape memory alloy and the spring 632 being made from stainless steel.

FIG. 10(b) shows yet another alternative embodiment of the conductance probe cleaner arrangement generally indicated as 600 that includes a first coil spring 632 made of a shape memory alloy in combination with a second coil spring 634 and an optional scraper 636 arranged on the tip 55 of the conductance probe.

FIG. 10(c) shows yet another alternative embodiment of the conductance probe cleaner arrangement generally indicated as 700 that includes a first coil spring 732 made of a shape memory alloy in combination with a second coil spring 734 and an optional scraper 736 arranged on the tip 55 of the conductance probe.

FIG. 10(d) shows yet another alternative embodiment of the conductance probe cleaner arrangement generally indicated as 800 that includes a first coil spring 832 made of a shape memory alloy in combination with a second coil spring 834 and an optional scraper 836 arranged on the tip 55 of the conductance probe.

It is important to note that the scope of the invention is not intended to be limited to any particular type, or kind, or configuration, or size, or length, or shape of shape memory alloys, or any particular type, or kind, or combination of materials used to make the shape memory alloys, or any particular dimensions of the shape memory alloys, or the any particular number of shape memory alloys used in the temperature sensitive element that forms part of the conductance probe cleaner arrangement according to the present invention. For example, FIG. 10 show other configurations that are possible in which a shape memory alloy part changes shape with changes in temperature and the movement of the shape memory alloy part is used or causes another part to wipe off deposits that may have built up on the metal tip of a probe. The present invention in intended to cover any and all shape memory alloy configurations that use the temperature induced, shape change properties of shape memory alloys for the purpose of probe cleaning.

SCOPE OF THE INVENTION

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

What is claimed is:

1. A conductance probe for adapting in a device having a container for holding a fluid therein, the conductance probe being installed therein for providing a conductance signal indicating whether it is in contact with the fluid, characterized in that
    the conductance probe comprises a conductance probe cleaning arrangement having a temperature sensitive element arranged on a tip of the conductance probe, responsive to a change in the temperature of the fluid, for wiping the tip of the conductance probe to keep deposits from building up thereon.

2. A conductance probe according to claim 1, wherein the temperature sensitive element includes one or more bi-metal discs.

3. A conductance probe according to claim 2, wherein the one or more bi-metal discs are slightly curved at room temperature.

4. A conductance probe according to claim 2, wherein, as the temperature in the device starts to increase, the bi-metal discs start to flatten out and inverts at a certain change in the temperature.

5. A conductance probe according to claim 4, wherein the one or more bi-metal discs have an inside surface with an inner diameter, the inside surface sliding along the tip as the disc inverts so as to clean deposits that have built up on the surface of the metal tip.

6. A conductance probe according to claim 4, wherein the one or more bi-metal discs invert with a snapping action to dislodge the deposits that have built up on the tip.

7. A conductance probe according to claim 1, wherein the temperature sensitive element includes one or more shape memory alloys having predetermined temperature related properties.

8. A conductance probe according to claim 7, wherein the one or more shape memory alloys are relatively weak and pliable below a certain transition temperature, and revert to a predetermined shape and become relatively strong and non-pliable above the certain transition temperature.

9. A conductance probe according to claim 7, wherein the one or more shape memory alloys is shaped as a coil spring.

10. A device according to claim 7, wherein the conductance probe cleaner includes a first coil spring made of a shape memory alloy and a second coil spring made from a different material, such as stainless steel, both stacked up end-to-end on the tip.

11. A conductance probe according to claim 10, wherein the second coil spring is lightly loaded thereon.

12. A conductance probe according to claim 11, wherein, at room temperature, the first coil spring is weak and is compressed close to its solid height (i.e. no space between the coils) by the second coil spring, and above its transition temperature (e.g. boiler operating temperature), the first spring becomes stronger, overpowers the second coil spring and elongates to its predetermined shape.

13. A conductance probe according to claim 2, wherein, when the device cools (e.g. during a boiler shutdown), the first coil spring reverts back to its weak condition and is again compressed close to its solid height (i.e. no space between the coils) by the second coil spring.

14. A conductance probe according to claim 10, wherein the first coil spring and/or the second coil spring have an inner surface with an inside diameter that is slightly larger than the outside diameter of the metal tip so that either or both springs wipe the surface of the tip when the first coil spring changes shape.

15. A conductance probe according to claim 1, wherein the device is a boiler having a heating element for boiling water contained therein.

16. A conductance probe according to claim 1, wherein the temperature sensitive element is arranged on a metal tip of the conductance probe so as to move axially when wiping the same.

17. A device having a container for holding a fluid therein and having a conductance probe installed therein for providing a conductance signal indicating whether it is in contact with the fluid, characterized in that
    the device comprises a conductance probe cleaning arrangement having a temperature sensitive element arranged on a tip of the conductance probe, responsive to a change in the temperature of the fluid, for wiping the tip of the conductance probe to keep deposits from building up thereon.

18. A device according to claim 17, wherein the temperature sensitive element includes one or more bi-metal discs.

19. A device according to claim 18, wherein the one or more bi-metal discs are slightly curved at room temperature.

20. A device according to claim 18, wherein, as the temperature in the device starts to increase, the bi-metal discs start to flatten out and inverts at a certain change in the temperature.

21. A device according to claim 20, wherein the one or more bi-metal discs have an inside surface with an inner diameter, the inside surface sliding along the tip as the disc inverts so as to clean deposits that have built up on the surface of the metal tip.

22. A device according to claim 20, wherein the one or more bi-metal discs invert with a snapping action to dislodge the deposits that have built up on the tip.

23. A device according to claim 17, wherein the temperature sensitive element includes one or more shape memory alloys having predetermined temperature related properties.

24. A device according to claim 23, wherein the one or more shape memory alloys are relatively weak and pliable below a certain transition temperature, and revert to a predetermined shape and become relatively strong and non-pliable above the certain transition temperature.

25. A device according to claim 23, wherein the one or more shape memory alloys is shaped as a coil spring.

26. A device according to claim 23, wherein the conductance probe cleaner includes a first coil spring made of a shape memory alloy and a second coil spring made from a different material, such as stainless steel, both stacked up end-to-end on the tip.

27. A device according to claim 26, wherein the second coil spring is lightly loaded thereon.

28. A device according to claim 27, wherein, at room temperature, the first coil spring is weak and is compressed close to its solid height (i.e. no space between the coils) by the second coil spring, and above its transition temperature (e.g. boiler operating temperature), the first spring becomes stronger, overpowers the second coil spring and elongates to its predetermined shape.

29. A device according to claim 28, wherein, when the device cools (e.g. during a boiler shutdown), the first coil spring reverts back to its weak condition and is again compressed close to its solid height (i.e. no space between the coils) by the second coil spring.

30. A device according to claim 26, wherein the first coil spring and/or the second coil spring have an inner surface with an inside diameter that is slightly larger than the outside diameter of the metal tip so that either or both springs wipe the surface of the tip when the first coil spring changes shape.

31. A device according to claim 17, wherein the device is a boiler having a heating element for boiling water contained therein.

32. A device according to claim 17, wherein the temperature sensitive element is arranged on a metal tip of the conductance probe so as to move axially when wiping the same.

* * * * *

UNITED STATES PATENT AND TRADEMARK OFFICE
CERTIFICATE OF CORRECTION

PATENT NO. : 7,275,429 B2
APPLICATION NO. : 11/101179
DATED : October 2, 2007
INVENTOR(S) : John E. Branzell and Christopher J. Thomson It is certified that error appears in the above-identified patent and that said Letters Patent is hereby corrected as shown below:

In abstract, line 2, "a" after "The" should be deleted.
In column 1, line 61, insert --)-- after "(b".
In column 3, line 65, after "operation" insert --,--.
In column 4, line 16, "that" should be deleted and "response" should be --respond--.
In column 4, line 24, after "present" insert --invention--.

Signed and Sealed this

Twenty-third Day of March, 2010

David J. Kappos
*Director of the United States Patent and Trademark Office*